United States Patent
Drader et al.

(10) Patent No.: US 7,710,466 B2
(45) Date of Patent: May 4, 2010

(54) METHOD AND APPARATUS FOR CONTROLLING A CAMERA MODULE TO COMPENSATE FOR THE COLOR SPECTRUM OF A WHITE LED

(75) Inventors: Marc Drader, Kitchener (CA); Ken Wu, Burlington (CA); Michael Purdy, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 553 days.

(21) Appl. No.: 11/626,886

(22) Filed: Jan. 25, 2007

(65) Prior Publication Data
US 2008/0180545 A1 Jul. 31, 2008

(51) Int. Cl.
H04N 9/73 (2006.01)
(52) U.S. Cl. .................................... 348/224.1
(58) Field of Classification Search .............. 348/223.1, 348/224.1, 370, 371
See application file for complete search history.

(56) References Cited

U.S. PATENT DOCUMENTS

| 5,177,599 | A | 1/1993 | Takagi et al. |
| 6,670,987 | B1 | 12/2003 | Taura |
| 2003/0030730 | A1 | 2/2003 | Nakayama |
| 2006/0082679 | A1* | 4/2006 | Chua et al. .................. 348/371 |
| 2006/0176379 | A1* | 8/2006 | Hyodo ..................... 348/223.1 |
| 2008/0266417 | A1* | 10/2008 | Abe ........................ 348/223.1 |

* cited by examiner

Primary Examiner—David L Ometz
Assistant Examiner—Dillon Durnford-Geszvain
(74) Attorney, Agent, or Firm—Louis B. Allard; Borden Ladner Gervais LLP (57) ABSTRACT

A method and an apparatus enabling use of a light source emitting a spectrum of light not following characteristics of a blackbody source of light with a camera module programmed for use with light sources following characteristics of blackbody sources of light, wherein a white-balance patch is transmitted to the camera module to cause the camera module to accept color coordinates representing a point on a chromaticity chart that partly defines a region of color coordinates on the chromaticity chart into which color coordinates of the light source fall and to which color coordinates of a reference white color derived by a white-balance routine of the camera module are constrained.

13 Claims, 5 Drawing Sheets

METHOD AND APPARATUS FOR CONTROLLING A CAMERA MODULE TO COMPENSATE FOR THE COLOR SPECTRUM OF A WHITE LED

BACKGROUND

1. Field

The disclosed and claimed concept relates generally to electronic devices and, more particularly, to a method for controlling a camera module incorporated into a portable electronic device to compensate for the characteristics of a white LED used as a flash for taking pictures.

2. Description of the Related Art

It is widely known to use a variety of different sources of light for taking a picture with a digital camera module, including natural sunlight, a xenon strobe, an incandescent bulb or a fluorescent bulb. Despite being very different light sources using very different processes to emit light, a common characteristic of all of these light sources is that the spectrums of light emitted by each of them, despite being different, provide a range of light frequencies that resemble the expected behavior of radiant emissions of a blackbody at given temperatures.

Figure 1:
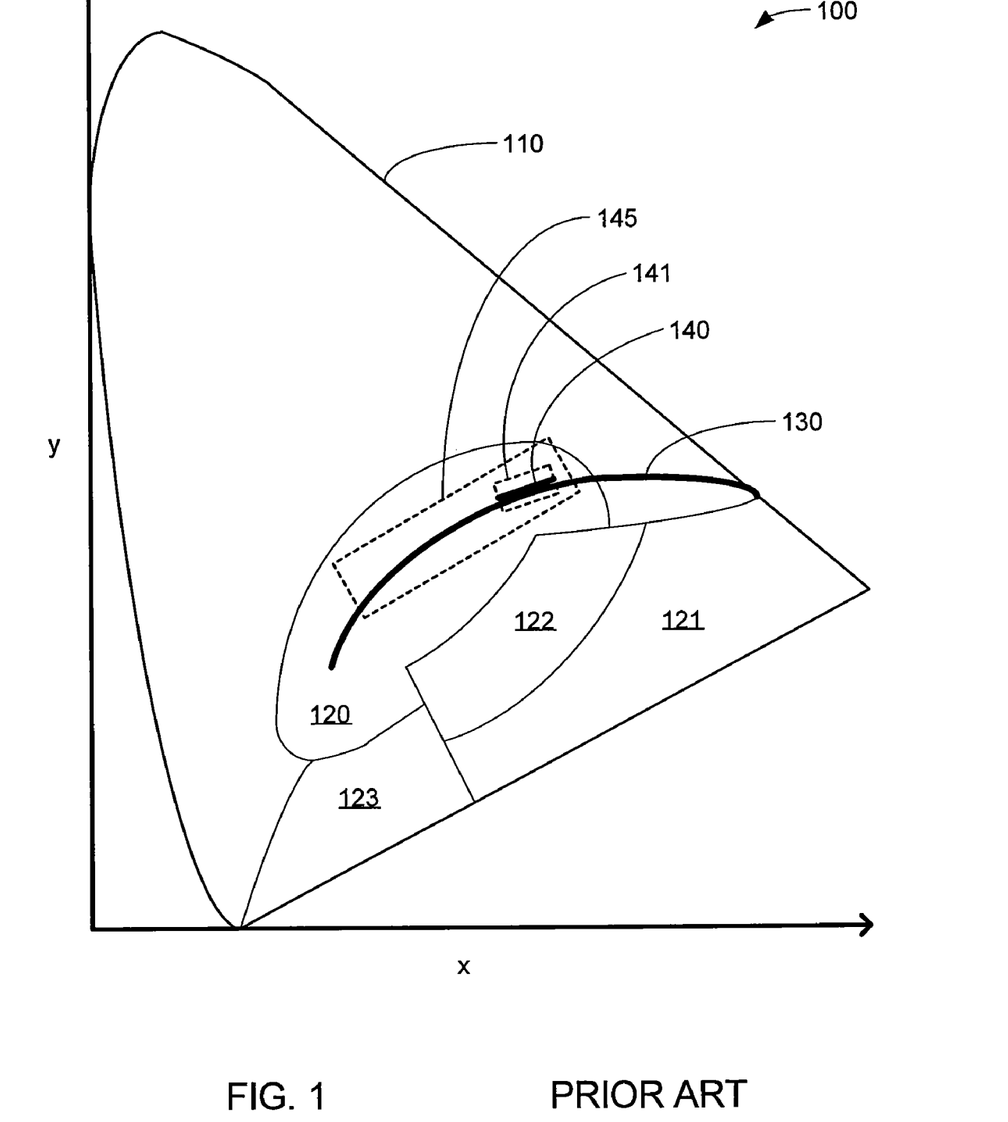
FIG. 1 is a simplified depiction of a CIE 1931 chromaticity chart depicting the black body curve and a PRIOR ART approach to specifying a reference white region within which a reference white color is constrained.

In 1931, an international committee called the Commission Internationale de L'Eclairage (CIE) met in Cambridge, England, and attempted to put forward a graphical depiction of the full range of colors of light that the human eye can actually perceive. This graphical depiction, namely a chromaticity chart, and the resulting standard incorporating this chromaticity chart has come to be known as "CIE 1931" and is widely used by scientists and photographers, among many others, in working with light in the visible light spectrum. FIG. 1 depicts a simplified representation of a chromaticity chart 100 based on the CIE 1931 standard, with all visible colors of light specifiable with two dimensional color coordinates. As can be seen, towards the center of what is frequently called the "horseshoe-shaped" visible region 110 of all that the human eye can perceive is a white region 120 of colors of light generally categorized as "white light" and surrounded by other regions generally described as non-white light, including a red region 121, a pink region 122 and a purple region 123. It should be noted that the exact boundaries of these regions 120-123 should be taken as approximations and not precise designations of color, since the classification of colors is necessarily subjective.

The human brain has evolved its own form of white-balancing capability by which human beings have little trouble discerning what color an object should be, even though it may be illuminated with light that is only marginally white, such as the reddish hue of the sun at sunset, the orange glow of campfire, or the bluish tint of a mercury vapor streetlight. It is due to this flexibility of the human brain that a number of light sources emitting a variety of different spectra of light, and thereby having a variety of differing color coordinates that occupy different points on a chromaticity chart, can be classified as "white" light sources with the result that the white region 120 in FIG. 1 occupies a considerable proportion of the visible region 110.

Passing through the white region 120 is a portion of a blackbody curve 130 depicting the set of color coordinates of white light sources that emit a spectrum of light frequencies that substantially follow the spectrum of light frequencies that would be expected to be emitted from theoretically ideal blackbody light sources heated to different temperatures. Most commonly used sources of white light have color coordinates specifying a point that falls along or substantially close to this blackbody curve 130, including sunlight and xenon flash strobes, as well as incandescent, fluorescent, high-pressure sodium and mercury vapor lamps. As a result of so many of the commonly used sources of light used in taking pictures having color coordinates representing points that fall on or relatively close to the blackbody curve 130, algorithms, constants and limit values employed in digital cameras to perform automatic exposure control and automatic white-balancing are commonly chosen and designed with a presumption that all light sources that will be encountered will be ones with such color coordinates. Indeed, this presumption has become so ingrained that it has become commonplace for manufacturers of camera modules incorporated into other electronic devices to have such choices of algorithms, constants and limit values built into or preprogrammed directly into the camera modules, themselves.

As those skilled in the art of white-balancing algorithms will recognize, a step taken by many known white-balancing algorithms is attempting to derive a reference white color in a given image as an input parameter for determining the degree to which the colors in that image are to be adjusted to compensate for the lighting in the original scene so that the objects in the resulting picture are presented with their correct colors. To do this, white-balancing algorithms typically require either that there be an object in the image that actually is white (known as the "white world" algorithm) or that the average of all the colors of all the pixels in the image be a gray (known as the "gray world" algorithm), and either of these approaches can provide a basis from which a reference white color for that image may be derived. However, it is possible to have images that do not provide a white object or that are filled with objects of colors that provide a very skewed result when averaging to derive a gray. An example of such an image is one filled with the tree leaves of a forest of trees such that the image is filled with different shades of green and little else, thereby providing no white objects and providing an average that will necessarily be a green color and not a gray. If white-balancing algorithms are allowed to process such an image without constraints, the result can be whited-out or blackened-out objects in the resulting picture, and so it is deemed desirable to specify boundaries for what a reference white color may be so as to constrain the degree to which a white-balancing algorithm is permitted to adjust colors.

Given the aforementioned presumption that the light sources to be encountered by a digital camera are likely to have color coordinates specifying points falling along or quite close to the blackbody curve 130, the format in which the boundaries for what a reference white color may be are communicated to typical camera modules in a manner that comports with this assumption. In this commonly used format, a pair of color coordinates that define the endpoints of a straight segment in a chromaticity chart, such as a segment 140 depicted in FIG. 1, are communicated to a camera module along with an error term (or "locus") specified in terms of a maximum perpendicular distance away from the segment 140. These two endpoints and the error term, together, specify a rectangular-shaped reference white region 141 within the white region 110 that defines these boundaries, thereby defining a set of acceptable color coordinates within which the white-balancing algorithm is permitted to choose a color to be a reference white for a given image. This is to allow a short segment that should resemble a small portion of the blackbody curve 130 to be specified, such as segment 140, and this short segment should be positioned to either largely overlie a portion of the blackbody curve 130 or to be relatively close to and relatively parallel with a portion of the blackbody curve 130. No allowance is made in this format for specifying the boundaries of a possible reference white with a reference white region having any other shape than a rectangular region, such as the reference white region 141 shown.

Also, given the same aforementioned presumption that the light sources to be encountered by a digital camera are likely to have color coordinates specifying points falling along or quite close to the blackbody curve 130, it is commonplace to in some way build minimum and/or maximum limits on values used to define the reference white region 141 such that values defining a reference white region 141 that does not substantially overlie the blackbody curve 130, or that is not at least substantially close to the blackbody curve 130 are rejected. The effective result is to create a limit region, such as limit region 145 depicted in FIG. 1, into which at least a portion of the white region 141 must fall.

Of those light sources having color coordinates representing points falling along or close to the blackbody curve 130, xenon strobes have become commonplace for use as flashes in portable electronic devices used in photography. A xenon strobe is very small in size while producing an extremely bright light that very quickly illuminates a setting of which a picture is to be taken. The amount of illumination needed from a flash to sufficiently light a scene for scanning its image is a measurable quantity and can be roughly calculated as the brightness of the flash multiplied by the amount of time it must be turned on. The brighter the light source used as a flash, the less time it needs to be turned on to sufficiently light a scene. Furthermore, the amount of time that a given flash needs to be turned is not necessarily related to the amount of time needed for an image scanning element (such as a CCD semiconductor device or a CMOS imaging device) to actually scan an image as part of the process of capturing that image. In other words, where a bright flash is used, it is not unheard of to actually turn off the flash before the image scanning element has completed scanning the image, because a sufficient amount of illumination has been supplied and leaving the flash on any longer would result in too high an amount of illumination and portions of the image being whited out. However, where a dimmer light source is used as a flash, the flash must be turned on for a longer period of time to achieve the same amount of illumination as a brighter light source, and it is often necessary to delay the start of scanning an image until a high enough amount of illumination has been achieved.

Recently, a new artificial source of white light, the so-called white LED, has been introduced, providing the opportunity to create a flash for use in digital photography that requires less power than other light sources. Unfortunately, the white LEDs have a range of color coordinates specifying a range of points that fall substantially distant from the blackbody curve 130, and furthermore, at least partly fall outside the white region 120 and into the pink region 122. This deviation of white LEDs from the blackbody curve 130 is largely due to the manner in which white LEDs produce light. White LEDs are in truth, blue LEDs that are partially covered with a yellowish phosphor that converts part of the blue light into yellow light. The result is a blending of blue and yellow light frequencies that approximates white light well enough for the human eye and the human brain to accept it as a source of white light. In essence, two different non-white light emissions, each having its own spectrum of light frequencies, are being blended to approximate white light and such a mixing of two non-white spectra is not characteristic of blackbody sources of radiant energy.

Also, white LEDs, though brighter than incandescent lamps of comparable size, are far dimmer than xenon strobes of comparable size. As a result, to achieve a desirable amount of illumination of a scene when used as a flash, a white LED must be kept on far longer than a xenon strobe used as a flash, and a white LED must also be supplied with a very high amount of electric power that would actually damage internal components of the white LED if that amount of power were maintained for more than a very brief period of time. In using a white LED as a flash, the amount of time during which the white LED is actually turned on can be kept short enough to prevent this damage. Unfortunately, even during the brief period in which the white LED is turned on, the light emitting semiconductor components of the white LED respond to the very high amount of power by converting an ever increasing proportion of that power into heat as time passes from the moment at which that power is first supplied to the moment when that power is removed. Correspondingly, as time passes the proportion of that power converted to visible light decreases such that the white LED is initially very bright when that power is first applied, but that brightness level almost immediately begins fading more and more as time passes. With this quickly fading of brightness, the color spectrum output by a white LED also changes quickly as time passes from the moment that it is turned on. This changing light level and this changing color spectrum must be taken into account in both calculating the amount of time a white LED is to be turned on to provide a sufficient total amount of illumination to serve as an effective flash and in compensating for its changing spectrum of light output in performing white-balancing.

Another feature of white LEDs not exhibited by artificial light sources long used in photography, including xenon strobes and incandescent bulbs, is the high variability in the color spectra of each of the blue and yellow elements of the light emitted by white LEDs. White LEDs and the technology to manufacture them are still sufficiently new that only slow progress has been made in exerting tighter control over the manufacture of white LEDs to achieve sufficient consistency to avoid having two white LEDs from the very same production run emit light that is of perceptibly different hues. For this reason, unlike other artificial light sources that have far higher consistency in the spectra of their emitted light, the size of the region of that the "white" light emitted by LEDs may fall within is considerably larger than for other light sources. As a result of these various issues, current practices in controlling a camera module's built-in white-balancing algorithm are insufficient to accommodate the very unique characteristics of white LEDs.

BRIEF DESCRIPTION OF THE DRAWINGS

A full understanding of the disclosed and claimed concept can be gained from the following Description when read in conjunction with the accompanying drawings in which:

DESCRIPTION

The accompanying figures and the description that follows set forth the disclosed and claimed concept in its preferred embodiments. It is, however, contemplated that persons generally familiar with handheld electronic devices will be able to apply the novel characteristics of the structures and methods illustrated and described herein in other contexts by modification of certain details. Accordingly, the figures and description are not to be taken as restrictive on the scope of the disclosed and claimed concept, but are to be understood as broad and general teachings.

For purposes of the description hereinafter, the terms "upper", "lower", "right", "left", "vertical", "horizontal", "top", "bottom", and derivatives thereof shall relate to the disclosed and claimed concept as it is oriented in the figures.

Figure 2:
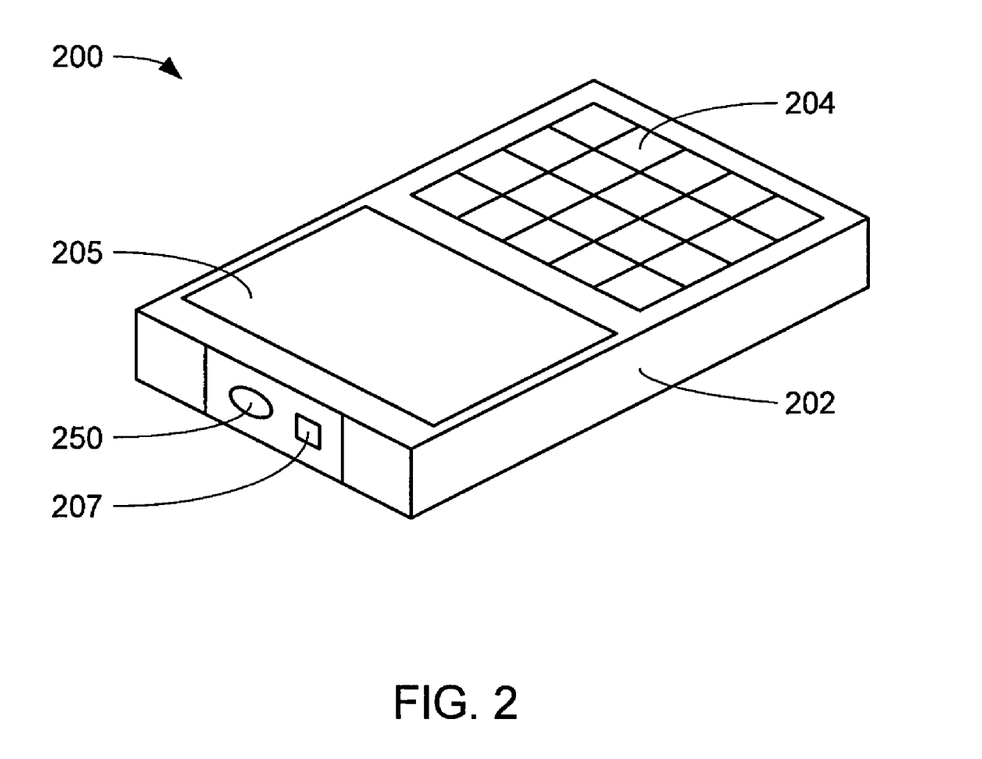
FIG. 2 is a depiction of an improved handheld electronic device in accordance with the disclosed and claimed concept.
Figure 3:
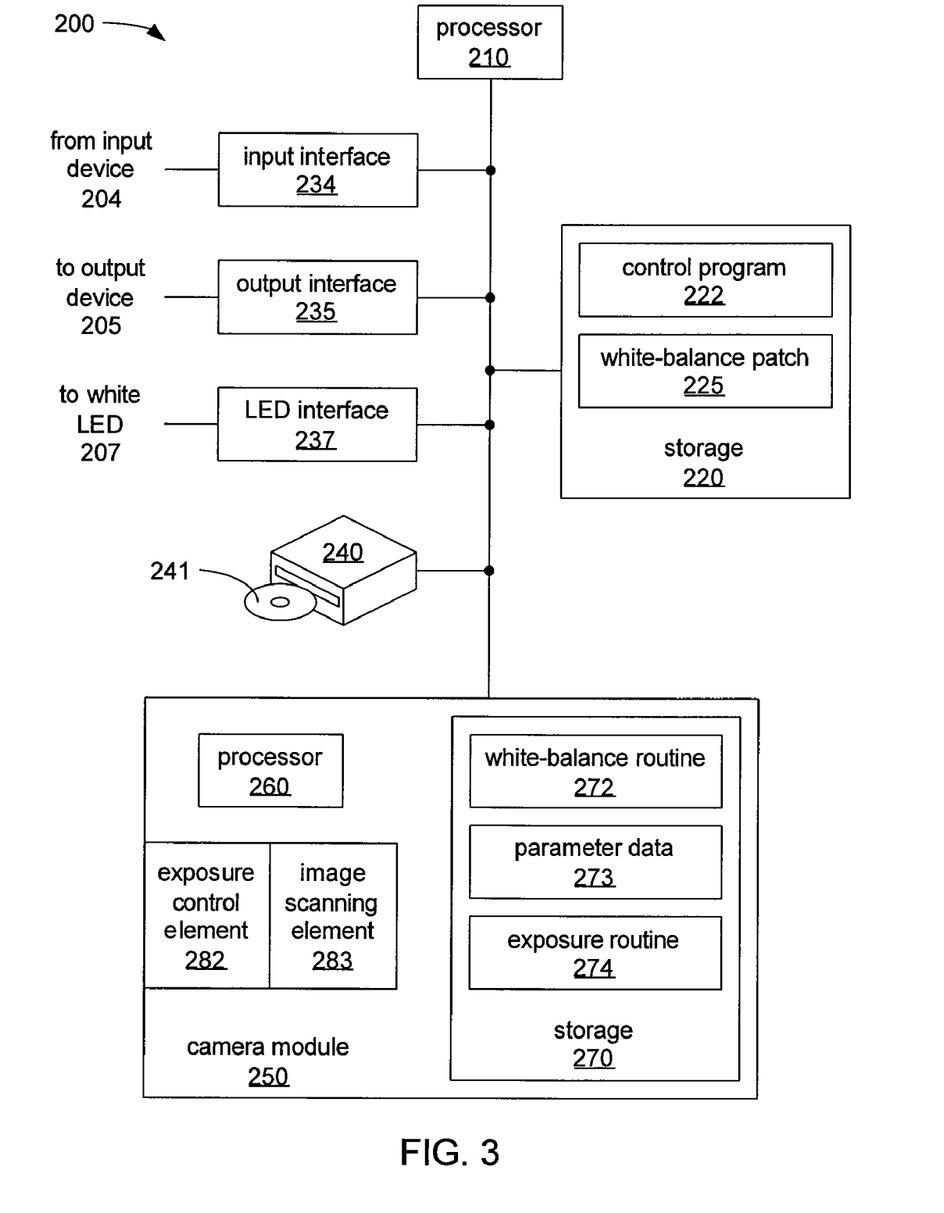
FIG. 3 is a schematic depiction of the improved handheld electronic device of FIG. 2.

An improved electronic device 200 is depicted generally in FIG. 2 and is depicted schematically in FIG. 3. The electronic device 200 may be a handheld or other portable electronic device (e.g. and without limitation, a digital camera, a PDA, a cell phone, a digital watch, or a laptop computer). The electronic device 200 incorporates a housing 202 on which are disposed a white LED 207 serving as a flash for taking pictures and a camera module 250. The housing 202 may additionally have disposed thereon an input device 204 and/or an output device 205. The electronic device 200 also incorporates a processor 210 connected to a storage 220, and a LED interface 237 controlling the LED 207. The processor 210 may additionally be connected to one or more of an input interface 234 receiving input from the input device 204, an output interface providing output to the output device 205, and a media storage device 240 capable of interacting with a storage medium 241 (which may or may not be of removable form). The camera module 250 incorporates a processor 260 connected to a storage 270, an exposure control element 282 and an image scanning element 283. Although described and depicted as being disposed on the housing 202 of the electronic device 200, the white LED 207 and/or the camera module 250 may alternatively be physically separate from the housing 202, but linked to other components of the electronic device 200 through a suitable electrical, optical, radio frequency or other linkage.

The processors 210 and 260 may be of any of a wide variety of processing devices, including and without limitation, microcontrollers, microprocessors, sequencers, digital signal processors or state machines implemented in hardware logic. In some embodiments, one or both of the processors 210 and 260 may be one of a number of commercially available processors executing at least a portion of the widely known and used "X86" instruction set and/or another instruction set.

The media device 240 and the storages 220 and 270 may be of any of a wide variety of types of storage devices, including and without limitation, disk drives (e.g. and without limitation, hard drives, floppy drives, magneto-optical drives, magnetic tape drives or CD-ROM drives), solid state memory (e.g. and without limitation, static RAM, dynamic RAM, ROM, EEPROM or FLASH) and memory card readers. However, in preferred practice, the storages 220 and 270 are generally more capable of supporting speedy random accesses than the media device 240, and the media device 240 is capable of supporting removable media while the storages 220 and 270 are not meant to be removable. In preferred practice, it is generally intended that the removable media device 240 support the exchange of data and/or software between the electronic device 200 and another electronic device (not shown) through the storage medium 241.

The white LED 207 may be any of a variety of semiconductor-based light emitting diodes capable of emitting light that substantially approximates white light. The white LED 207 may be fabricated by applying a coating to a blue LED that converts at least some of the emitted blue light into a yellow light such that a combination of blue and yellow light is produced that approximates white light to the perception of the human eye. Alternatively, the white LED 207 may be fabricated in other ways as those skilled in the art will readily recognize, including, but not limited to, adding or applying red and green phosphors to a blue LED. The LED interface 237 allows the processor 210 to control when the white LED 207 is turned on and may allow the processor 210 to control the intensity of the light emitted by the white LED 207.

The camera module 250 may be any of a variety of commercially available camera modules fabricated by a variety of manufacturers for the purpose of being incorporated into other devices, such as the electronic device 200. The image scanning element 283 may be one of a variety of available charge-coupled devices (CCD) or CMOS imaging devices, or may be another suitable form of device capable of scanning an image of objects in its view. The exposure control element 282 provides an aperture of controllable dimensions through which the light from the objects in the view of the image scanning element 283 passes to reach the image scanning element 283. Alternatively, the exposure control element 282 may control the amount of light reaching the image scanning element 283 in other ways known to those skilled in the art.

The input device 204 may be of any of a variety of input devices capable of accepting input from a user of the electronic device 200, including without limitation switches, a keypad, a joystick, a rollerball, or a touchpad. In embodiments that incorporate the input device 204, the input interface 234 couples the processor 210 to the input device 204 to receive input therefrom. The output device 205 may be of any of a variety of output devices capable of providing information to a user of the electronic device 200, including without limitation lights, a display device, an audible indicator, or a tactile device such as a vibrator mechanism causing the electronic device 200 to vibrate such that a user of the electronic device 200 is able to feel the vibration. In embodiments that incorporate the output device 205, the output interface 235 couples the processor 210 to the input device 205 to provide output thereto.

When the electronic device 200 is used to take a picture, the processor 210 accesses the storage 220 to retrieve and execute a sequence of instructions of a control program 222, thereby causing the processor 210 to transmit sequences of instructions and/or data to the camera module 250 and to operate the camera module to scan one or more images as will shortly be explained. In turn, the processor 260 accesses the storage 270 to retrieve and execute sequences of instructions from a white-balance routine 272, an exposure routine 274 and/or another sequence of instructions provided by the processor 210, thereby causing the processor 260 to operate the exposure control element 282 and the image scanning element 283 to carry out the scanning of one or more images. The processors 210 and 260 are caused to interact to transfer the data representing the resulting picture from the camera module 250 to be stored in the storage 220, or perhaps the media storage device 240 if present. Where the taking of a picture entails the use of the white LED 207 as a flash, the processors 210 and 260 may be caused to further interact in controlling the timing and intensity of the lighting supplied by the white LED 207 through the LED interface 237.

In embodiments of the electronic device 200 having the input device 204 and/or the output device 205, the processor 210 is further caused by the control program 222 to operate the input interface 234 and/or the output interface 235 to interact with the user of the electronic device 200 through one or both of the input device 204 and the output device 205. Where the input device 204 includes a relatively small number of switches providing the user with the ability to control various aspects of the process of taking a picture (e.g. without limitation, the focus, the landscape or portrait mode, and whether or not to use a flash), the processor 210 receives such input from the user and carries out the taking of a picture, accordingly. Where the input device 204 includes a keypad or other device providing greater flexibility of input, the user may be provided with the ability to enter data concerning the picture to be taken, such as a time, place or name of the subject of the picture. Where the output device 205 includes a graphical display, the processor 210 may be caused by the control program 222 to present the user with a view of what the image scanning element 283 sees before the picture is taken and/or a view of the resulting picture on the output device 205.

In embodiments of the electronic device 200 having the media storage device 240, the processor 210 may be further caused to store pictures taken by the user on the storage medium 241 for the user to transfer to another electronic device (not shown) for display, archiving and/or printing. Where such embodiments also incorporate a form of both the input device 204 and the output device 205 of sufficient ability, the processor 210 may be further caused to provide the user of the electronic device 200 with the ability to use the input device 204 and the output device 205 to view and select pictures to be stored on the storage medium 241, as well as to select pictures to be deleted. Alternatively, or in addition to the media storage device 240, the electronic device 200 may further incorporate a communications interface (not shown) allowing the electronic device 200 to be directly connected to another electronic device for the transferring of pictures, other data and/or software (e.g. without limitation, a digital serial interface such as IEEE 1394).

As previously described, the camera module 250 may be any one of a variety of commercially available camera modules from a variety of manufacturers for incorporation into various electronic devices, including the electronic device 200. The white-balance routine 272 may be based on any of a variety of widely known white-balancing algorithms (including the earlier-described gray world and white world algorithms) to derive a reference white color for a given image that is used to determine the degree to which the white-balance routine 272 is to be used to modify that image to compensate for the lighting used. However, as was also previously described, it is common practice to impose constraints on white-balancing algorithms to prevent overcompensation for lighting that can result where the colors in an image do not provide white-balancing algorithms with the reference colors needed to function, correctly.

Unfortunately, the commonplace manner of describing the reference white region of color coordinates to which the point representing a reference white color is to be constrained as a rectangular region that is substantially adjacent to or that substantially overlies a portion of a blackbody curve on a chromaticity chart is based on the assumption that whatever source of light is used to illuminate an image will exhibit characteristics largely conforming to what would be expected of a corresponding blackbody source of radiation. This same assumption has also resulted in the commonplace practice of incorporating into a parameter data 273 within the storage 270 a set of minimum and maximum value limits that will be accepted for specifying the color coordinates defining the segment that partly defines that rectangular region. In effect, these minimum and maximum value limits describe a limit region into which at least a portion of the white reference region must fall. Unfortunately, to describe a rectangular region within which the color coordinates of the white LED 207 are likely to fall requires specifying color coordinates that are outside such minimum and maximum value limits.

As part of the earlier-described process of taking a picture where the white LED 207 is employed as a flash, the processor 210 is caused by the control program 222 to provide the camera module 250 with a pair of color coordinates (i.e., the pair of points defining a segment) and an error term (or "locus") that define a rectangularly-shaped reference white region to which the point defined by the color coordinates of the reference white color derived by the white-balance routine 272 are to be constrained. However, to overcome the commonplace limitations imposed by the minimum and maximum value limits stored within the parameter data 273, the processor 210 is first caused by the control program 222 to transmit to the camera module 250 a white-balance patch 225 retrieved by the processor 210 from the storage 220. In some embodiments, the white-balance patch 225 provides at least one alternate minimum and/or maximum value that the processor 260 uses in place of at least one minimum and/or maximum value of the parameter data 273 when executing a sequence of instructions of the white-balance routine 272. In other embodiments, the white-balance patch 225 provides an alternate sequence of instructions to be executed by the processor 260 in place of at least a portion of a sequence of instructions of the white-balance routine 272. In still other embodiments, both alternate value(s) and alternate instructions are provided. In effect, these alternate value(s) and/or instructions redefine the boundaries of the limit region into which at least a portion of a reference white region must fall. This redefining may entail resizing the limit region, may entail shifting the position of the limit region on a chromaticity chart, or may entail both.

Figure 4:
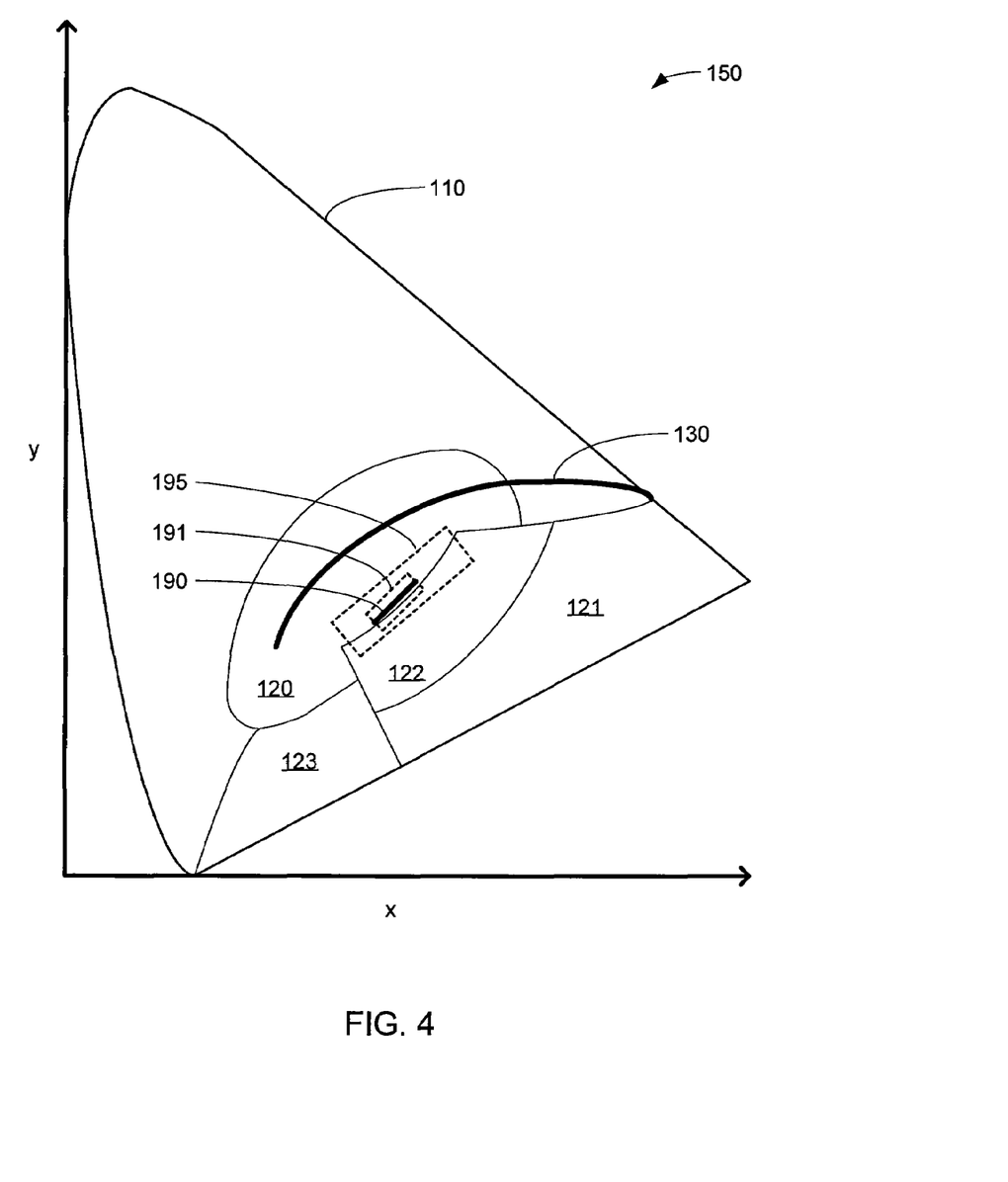
FIG. 4 is another simplified depiction of a CIE 1931 chromaticity chart depicting the black body curve and an approach to specifying a reference white region within which a reference white color is constrained in accordance with the disclosed and claimed concept.

FIG. 4 depicts a chromaticity chart 150, that when compared to the chromaticity chart 100 of FIG. 1, illustrates the change enabled with transmission of the white-balance patch 225 to the camera module 250. Upon receiving the white-balance patch 225, the limit region 145 of chromaticity chart 100 is redefined to create an alternate limit region 195 such that the camera module 250 is able to accept a pair of color coordinates defining a pair of points that define an alternate segment 190, that along with an appropriate error term, define a rectangularly-shaped alternate reference white region 191. The alternate reference white region 191 defines the constraints to which color coordinates specifying a point for a reference white color that better corresponds with the use of the white LED 207 will be held. As can be seen, unlike the reference white region 141, at least a portion of the alternate reference white region 191 lies outside the limit region 145 and the alternate reference white region 191 neither overlies nor is substantially adjacent to the blackbody curve 130.

It should be noted that although the alternate limit region 195 is depicted as a tilted rectangular region not unlike the reference white region 191, other configurations of the limit region 195 are possible as those skilled in the art will readily recognize. Furthermore, in various embodiments, the alternate limit region 195 may represent an expansion of the limit region 145, a shifting of the limit region 145, a replacement of the limit region 145, a provision of an alternate limit region in addition to the limit region 145, or other form of redefinition of the limit region 145 as those skilled in the art will readily recognize.

As also previously discussed, the white LED 207 is a dimmer source of visible light than a xenon strobe, requiring that the white LED 207 remain turned on longer than a xenon strobe to achieve a comparable amount of illumination in illuminating a scene. However, even though this longer period is still short enough to be perceived by the human eye as a mere flash, it is long enough for the level of visible light output by the white LED 207 to fade significantly from the time the white LED 207 is first turned to the time the white LED 207 is turned off. This changing light level adds complexity to the operation of the exposure routine 274 that causes the processor 260 to control the exposure control element 282 to adjust the amount of light received by the image scanning element 283 in taking a picture. Also, as those skilled in the art will readily recognize, a changing light level from a light source also results in a changing color spectrum for the light output by that light source, and this adds complexity to the operation of the white-balance routine 272. To address the changing light level and the changing color spectrum occurring during use of the white LED 207 as a flash, the processor 210 is caused by the control program 222 to operate the camera module 250 in a mode that is normally reserved for use in lighting conditions in which no flash is used.

In the prior art digital cameras, it is commonplace to operate a camera module to scan a single image when a flash is used, and to operate a camera module to scan a succession of images when a flash is not used. With light sources that might be used as a flash, other than a white LED, the characteristics of the spectrum of light emitted are more tightly controllable, are more consistent and are far better known given the many years that other light sources have been used in photography. Therefore, a camera module may be given a set of highly reliable initial values as inputs to white-balancing and/or exposure algorithms with considerable confidence that those values are likely to be correct enough for most forms of scenery such that an image of that scenery need be scanned only once. However, where a flash is not used, the lighting within the scene, itself, is being relied upon to provide the necessary illumination, and unlike a flash incorporated into a digital camera, the characteristics of that lighting cannot be described to the camera module with such precision. Therefore, it is commonplace to supply the camera module with a highly general set of initial values that are deemed most likely to be applicable to most situations, and to then scan a rapid succession of images when the user of the digital camera presses a button to take a picture. With each successive image, the initial values are adjusted based on an analysis of the results of applying the initial values to the preceding image.

It should be noted that part of the reason that the scanning of multiple images is necessary to support the successive use of white-balancing and/or exposure algorithms is that it is commonplace practice to keep the costs of camera modules low by not incorporating a frame buffer into camera modules. In other words, white-balancing and exposure algorithms must be applied to the pixels of an image as the image seen by a camera module's image scanning element is scanned by the image scanning element. If a frame buffer capable of holding an entire scanned image were incorporated into a camera module, it would be possible to actually capture an image (wherein capturing an image entails both scanning and storing the image, and not merely scanning it) and repeatedly apply white-balancing and/or exposure algorithms to the single captured image while refining the initial values with each application of those algorithms. The scanning of the 3, 4, 5 or possibly more images occurs quickly enough that the user of the digital camera does not realize that multiple images are being scanned in taking a single picture, but with the scanning of a succession of images, the white-balancing and/or exposure algorithms are provided with multiple opportunities to more precisely compensate for unknown lighting conditions.

As part of the earlier-described process of taking a picture where the white LED 207 is employed as a flash, the processor 210 is caused by the control program 222 to operate the camera module 250 as if a picture without a flash were being taken such that the camera module 250 is caused to scan a succession of images. The processor 210 is caused to supply the camera module 250 with initial values to be employed by the processor 260 in executing sequences of instructions from the white-balance routine 272 and/or the exposure routine 274. Unlike a situation in which lighting with unknown characteristics at a scene is employed, the characteristics of the white LED 207 are known, although some of those characteristics are expected to vary. Also, the processor 210 may be caused to perform one or more calculations to derive one or more of the initial values based on one or more inputs, such as a manual setting regarding light levels or exposure time provided by a user of the electronic device 200, or an input from a light level sensor (not shown).

The processor 210 then directs the camera module 250 to begin scanning a succession of images of a scene and the processor 210 operates the LED interface 237 to turn on the white LED 207. Use is made of the fact that the white LED 207 is sufficiently dim that the white LED 207 will have to be turned on for a period of time long enough that a number of images can easily be scanned by the camera module 250 while the LED 207 is still turned on. The scanning of images is directed by the processor 210 to begin within a very short period of time after the white LED 207 is turned on. Although this results in a relatively small amount of illumination having been applied to a scene at the time the first image is scanned, such an initial amount of lighting is sufficient for the processor 260 to execute sequences of instructions of the white-balance routine 272 and/or the exposure routine 274 to begin the process of refining the initial values to compensate for the light provided by the white LED 207. As each successive image is scanned, more time passes during which the white LED 207 is turned on and more of the total illumination required to fully illuminate a given scene is supplied by the white LED 207.

During the scanning of these successive images, the spectrum of light provided by the white LED 207 changes as an increasing proportion of the electrical energy supplied to the white LED 207 is converted to heat (instead of visible light) over time. However, the degree of change in the spectrum between the scans of successive images is small enough that the process of successive refinement of the initial values is able to compensate for it. In some embodiments, the quantity of successive images to be scanned is a set value preprogrammed into the camera module 250. In other embodiments, the degree to which the initial values are changed with each refinement accompanying the scanning of each successive image is analyzed to determine if the degree of change has reached a low enough threshold level between the two most recently scanned images that there is unlikely to be further significant refinement with the scanning of any more images.

Figure 5:
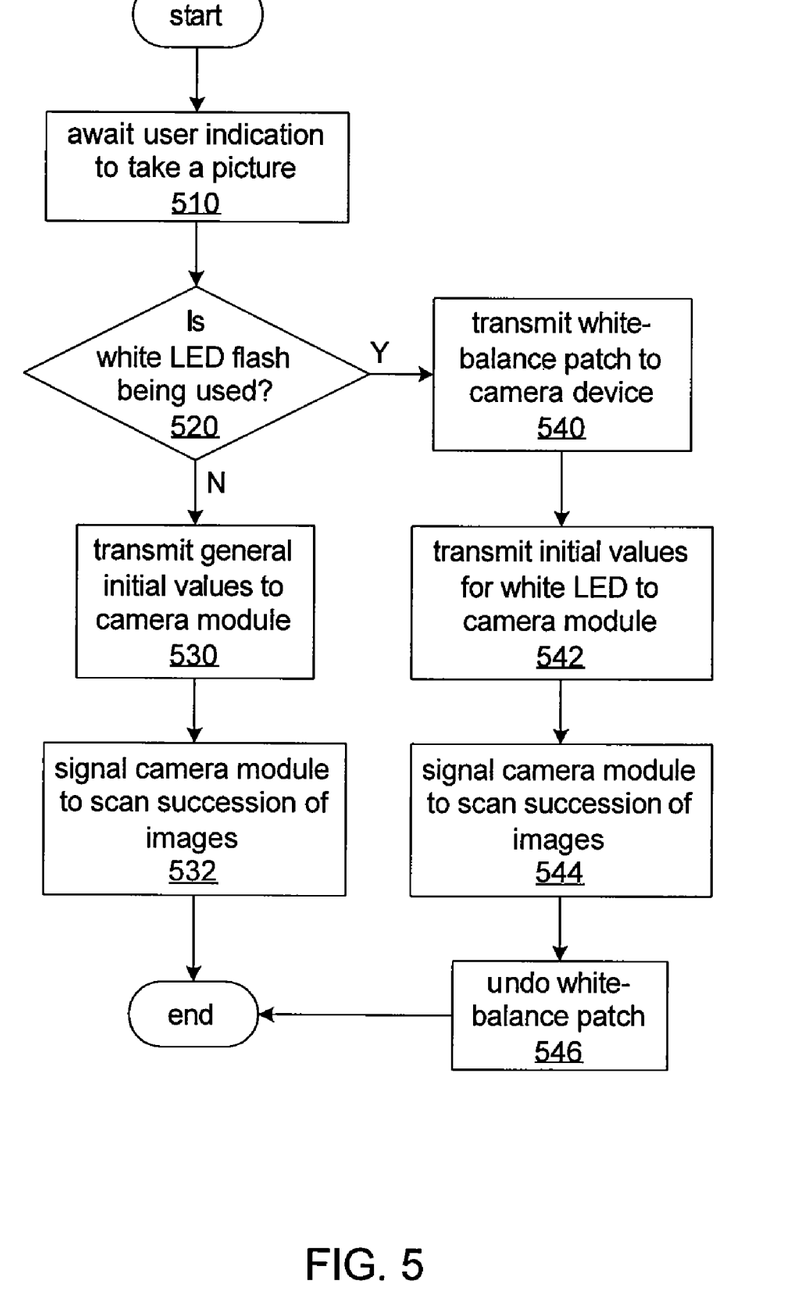
FIG. 5 is a flowchart depicting an embodiment of an improved method in accordance with the disclosed and claimed concept.

FIG. 5 is a flow chart of an embodiment of an electronic device with a white LED and a camera module being used to take a picture. Starting at 510, the electronic device awaits an indication from a user of the electronic device to take a picture. Such an indication may be supplied by the user pressing a button disposed on the housing of the electronic device, a timer set by the user, or another mechanism under the user's control. At 520, the next step is determined by whether or not the white LED of the electronic device is used as a flash in taking the picture. Whether or not the white LED is used may be determined by an input provided by the user (e.g., without limitation, a switch operated by the user to control use of the white LED) or by an automated function of the electronic device in which the white LED is employed as a flash if a sensor of the electronic device detects insufficient light to take the picture without using the white LED.

If at 520, the white LED is not used as a flash, then a set of general initial values applicable to a wide variety of possible light sources that may be present in a given scene are transmitted to the camera module at 530. Given that natural sunlight is highly likely to be the source of light relied upon in such circumstances, the initial values are likely to be chosen to prepare the light-balancing and/or exposure routines of the camera module for a light source having characteristics consistent with a blackbody source of light. One or more of the initial values may be derived and/or modified by a processor of the electronic device into which the camera module is incorporated to take into account input from a light level sensor providing an indication of the amount of light available in the given scene.

At 532, the electronic device signals the camera module to scan a succession of images. As discussed earlier, repetitive application of white-balancing and/or exposure routines allows greater refinement of the initial values, and the scanning of a succession of images of a given scene is necessary for a camera module having no frame buffer in which a single complete scanned image could be stored (such that the image could be said to have been "captured" rather than simply scanned) to allow the white-balancing and/or exposure routines to be repeatedly applied to a single captured image.

However, if at 520, the white LED is used as a flash, then a white-balance patch is transmitted to the camera module at 540. As previously discussed, it is common practice for camera modules to be programmed with minimum and maximum limits for initial values transmitted to the camera module by the electronic device that are based on the assumption that all light sources will exhibit characteristics consistent with a blackbody source of light. These initial values include values defining a reference white region on a chromaticity chart into which the point specified by the color coordinates of a reference white color derived by the camera module's white-balancing routine must fall. However, as previously discussed, the typical minimum and maximum limits for these initial values define a limit region that does not permit color coordinates defining a reference white region at a location more appropriate for a white LED to be specified. The white-balance patch transmitted at 540 provides the camera module with at least one alternate minimum/maximum value more appropriate for those color coordinates and/or provides a substitute sequence of instructions to be executed by a processor within the camera module in place of at least a portion of the camera module's white-balancing routine.

At 542, initial values corresponding to the use of the white LED are transmitted to the camera module, including a pair of segments and an error term defining a reference white region into which the point denoted by the color coordinates of a derived reference white color will be constrained. At 544, the electronic device signals the camera module to scan a succession of images. During the scanning of those images, the initial values corresponding to the use of the white LED are further refined to allow more precise compensation for the changing light provided by the white LED. At 546, with the picture having been taken, the electronic device may transmit a signal to the camera module causing the erasure of the white-balance patch from a storage within the camera module, or causing some other action to occur that counteracts the white-balance patch.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling use of a camera module with a light source, the camera module being programmed for use with sources of light that emit spectra of light that follow a characteristic of blackbody sources of light and that fall within a limit region of a chromaticity chart that overlies a portion of a blackbody curve on the chromaticity chart, the camera module having a white-balance routine that is structured to receive data defining a reference white region to derive a reference white color constrained to fall within that reference white region and that is structured to reject data defining an alternate reference white region that falls at least partially outside the limit region, the light source emitting a spectrum of light that does not follow the characteristic of blackbody sources of light and that falls outside the limit region, the method comprising:

transmitting a white-balance patch to the camera module;

employing the white-balance patch to override at least one original boundary that defines the limit region with at least one replacement boundary that redefines the limit region to create an alternate limit region to cause at least a portion of the spectrum of light of the light source serving as a flash to fall within the alternate limit region as redefined by the at least one replacement boundary; and transmitting to the camera module data representative of a first point that falls outside the limit region defined by the at least one original boundary, that falls within the alternate limit region redefined by the at least one replacement boundary, and that partly defines an alternate reference white region, wherein the alternate reference white region is defined such that no portion of the alternate reference white region overlies any portion of the blackbody curve.

2. The method of claim 1, further comprising employing as the light source a LED that emits a combination of yellow light and blue light approximating white light.

3. The method of claim 1, further comprising employing as the light source a blue LED to which red and green phosphors have been added.

4. The method of claim 1, further comprising including in the white-balance patch at least one substitute limit value that defines the at least one replacement boundary and that overrides at least one limit value that defines the at least one original boundary.

5. The method of claim 1, further comprising including in the white-balance patch at least one substitute sequence of instructions that overrides at least one sequence of instructions of the white-balance routine of the camera module.

6. The method of claim 1, further comprising transmitting to the camera module data representative of a second point on the chromaticity chart wherein the first and second points define endpoints of a segment that partly defines the alternate reference white region.

7. The method of claim 6, further comprising transmitting a locus wherein the segment and the locus define the alternate reference white region.

8. An electronic device capable of taking a picture, the electronic device comprising:
- a camera module programmed for use with sources of light that emit spectra of light that follow a characteristic of blackbody sources of light and that fall within a limit region of a chromaticity chart that overlies a portion of a blackbody curve on the chromaticity chart, the camera module having a white-balance routine that is structured to receive data defining a reference white region to derive a reference white color constrained to fall within that reference white region and that is structured to reject data defining an alternate reference white region that falls at least partially outside the limit region;
- a light source that emits a spectrum of light that does not follow the characteristic of blackbody sources of light and that falls outside the limit region;
- a storage medium having stored therein a control program comprising a sequence of instructions; and
- a processor capable of communicating with the camera module and capable of controlling the light source, the processor being configured to perform, under the sequence of instructions, steps comprising:
  - transmitting a white-balance patch to the camera module;
  - employing the white-balance patch to override at least one original boundary that defines the limit region with at least one replacement boundary that redefines the limit region to create an alternate limit region to cause at least a portion of the spectrum of light of the light source serving as a flash to fall within the alternate limit region as redefined by the at least one replacement boundary; and
  - transmitting to the camera module data representative of a first point that falls outside the limit region defined by the at least one original boundary, that falls within the alternate limit region redefined by the at least one replacement boundary, and that partly defines an alternate reference white region,
  - wherein the alternate reference white region is defined such that no portion of the alternate reference white region overlies any portion of the blackbody curve.

9. The electronic device of claim 8, wherein the light source is a LED that emits a combination of yellow light and blue light approximating white light.

10. The electronic device of claim 8, wherein the white-balance patch includes at least one substitute limit value that defines the at least one replacement boundary and that overrides at least one limit value that defines the at least one original boundary.

11. The electronic device of claim 8, wherein the white-balance patch includes at least one substitute sequence of instructions that overrides at least one sequence of instructions of the white-balance routine of the camera module.

12. The electronic device of claim 8, wherein the control program further causes the processor to transmit a signal to the camera module to erase the white-balance patch from within the camera module.

13. The electronic device of claim 8, further comprising an input device operable by a user of the electronic device to select between using the light source to take a picture of a scene and using light available at the scene to take a picture of the scene, and wherein the processor is further caused to refrain from transmitting the white-balance patch to the camera module in response to the user operating the input device to select using the light available at the scene.

* * * * *